US012385463B2

(12) United States Patent
Steiner

(10) Patent No.: US 12,385,463 B2
(45) Date of Patent: Aug. 12, 2025

(54) ARTICULATED-WING POWER GENERATION

(71) Applicant: John Steiner, Boise, ID (US)

(72) Inventor: John Steiner, Boise, ID (US)

( * ) Notice: Subject to any disclaimer, the term of this patent is extended or adjusted under 35 U.S.C. 154(b) by 0 days.

(21) Appl. No.: 17/663,905

(22) Filed: May 18, 2022

(65) Prior Publication Data

US 2022/0372949 A1 Nov. 24, 2022

Related U.S. Application Data

(60) Provisional application No. 63/190,339, filed on May 19, 2021.

(51) Int. Cl.
*F03B 17/06* (2006.01)

(52) U.S. Cl.
CPC ...... *F03B 17/065* (2013.01); *F05B 2220/706* (2013.01); *F05B 2240/40* (2013.01)

(58) Field of Classification Search
CPC .............. F03B 17/065; F05B 2220/706; F05B 2240/40
See application file for complete search history.

(56) References Cited

U.S. PATENT DOCUMENTS

| | | | | |
|---|---|---|---|---|
| 5,324,169 | A * | 6/1994 | Brown | F03B 17/06 416/17 |
| 5,708,305 | A * | 1/1998 | Wolfe | F03B 13/1815 60/497 |
| 5,899,664 | A * | 5/1999 | Lawrence | F03B 17/06 417/334 |
| 6,323,563 | B1 | 11/2001 | Kallenberg, Jr. | |
| 6,652,232 | B2 | 11/2003 | Bolduc | |
| 6,726,440 | B2 | 4/2004 | Pollard, V | |
| 7,989,973 | B2 | 8/2011 | Birkestrand | |
| 8,049,357 | B2 | 11/2011 | Saavedra | |
| 8,288,883 | B2 | 10/2012 | Finnigan | |
| 8,657,575 | B2 | 2/2014 | Morris | |
| 9,291,147 | B2 | 3/2016 | Jones | |
| 10,590,907 | B2 | 3/2020 | Chen et al. | |
| 10,711,761 | B2 | 7/2020 | Mckinley | |
| 10,968,884 | B2 | 4/2021 | English | |
| 2009/0056327 | A1 | 3/2009 | Raikamo et al. | |
| 2011/0254276 | A1* | 10/2011 | Anderson, Jr. | F03B 17/061 416/176 |

(Continued)

FOREIGN PATENT DOCUMENTS

| | | |
|---|---|---|
| EP | 2469073 A2 | 6/2012 |
| JP | 6550569 B2 | 7/2019 |

OTHER PUBLICATIONS

International Searching Authority; International Search Report and Written Opinion for Application No. PCT/US2022/72431 Aug. 9, 2022.

*Primary Examiner* — Viet P Nguyen
(74) *Attorney, Agent, or Firm* — Parsons Behle & Latimer

(57) ABSTRACT

An energy generation system to generate energy from a fluid flow, the energy generation system including an extendable arm that extends into a fluid flow, a fin connected to one end of the extendable arm and causing, due to the fluid flow, the extendable arm to move from a first orientation within the fluid flow to a second orientation within the fluid flow, and a joint connected to a second end of the extendable arm that couples the extendable arm to an energy generator.

15 Claims, 9 Drawing Sheets

(56) References Cited

U.S. PATENT DOCUMENTS

| | | | | |
|---|---|---|---|---|
| 2015/0054287 A1* | 2/2015 | Jones | F03D 9/008 290/55 |
| 2017/0167467 A1 | 6/2017 | Toran et al. | |
| 2017/0175701 A1 | 6/2017 | Barrett | |
| 2020/0232442 A1* | 7/2020 | Bird | F03B 17/061 |

* cited by examiner

ARTICULATED-WING POWER GENERATION

CROSS-REFERENCE TO RELATED APPLICATIONS

This application, under 35 U.S.C. § 119, claims the benefit of U.S. Provisional Patent Application Ser. No. 63/190,339 filed on May 19, 2021, and entitled "Articulated-Wing Power Generation," the contents of which are hereby incorporated by reference herein.

FIELD OF THE DISCLOSURE

This disclosure relates generally to fluid-flow energy generation. In particular, this disclosure relates to articulated wing energy generation systems and methods.

BACKGROUND

Hydroelectric and wind-power generators are generally known. Typically, hydroelectric systems require a dam or the like to store sufficient water to turn the turbines and associated generators used to generate electricity. Dams can be costly, can interfere with natural habitats and fish migration, and typically require extensive upkeep and maintenance.

Wind based turbines may allow for more flexible placement and location. However, wind turbines can only generate electricity when sufficient wind is blowing. Other drawbacks, inefficiencies, and issues are also present in current systems and methods.

SUMMARY

Accordingly, disclosed embodiments address the above-noted, and other, drawbacks, inefficiencies, and issues with existing systems and methods. Disclosed embodiments include articulated wing-based energy generation systems that operate in a flowing fluid. As used herein, "fluid" means any liquid or gas that flows. As also used herein, "energy" means any potential to do work and includes, but is not limited to, electricity generation, hydraulic power, pneumatic power, mechanical power, and the like.

Disclosed embodiments include an extendable arm that can be positioned in a fluid flow. A fin or wing on one end of the extendable arm is impacted by at least a portion of the fluid flow and causes the extendable arm to move. In some embodiments, the fin or wing is coupled to the extendable arm through a pivot joint that changes the orientation of the fin or wing upon reaching a set point or set time and causes the extendable arm to move in the opposite direction. The other end of the extendable arm is coupled to an energy generator that creates energy due to the motion of the extendable arm.

Other embodiments also exist.

Figure 1:
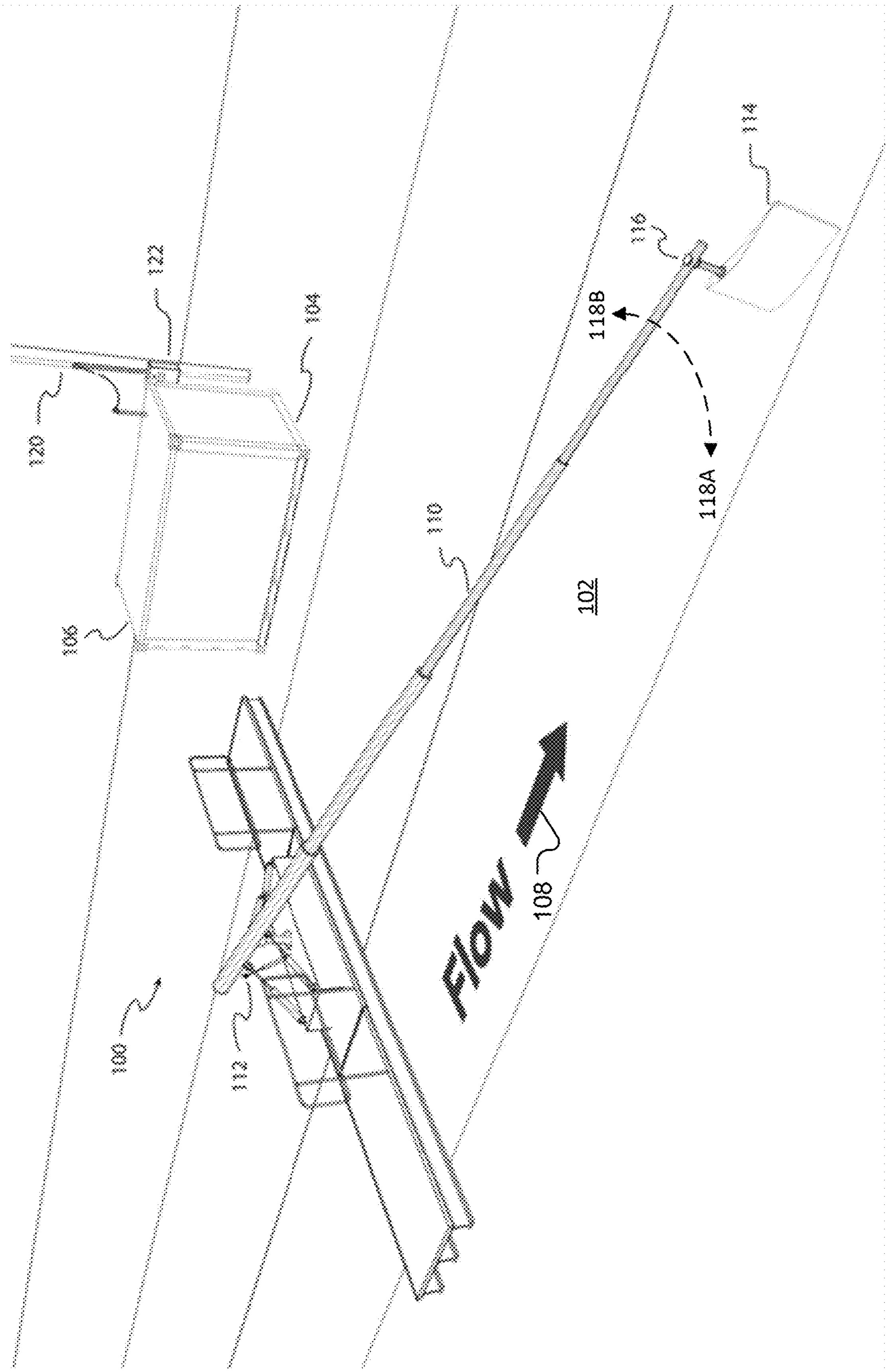
FIG. 1 illustrates an embodiment of an articulated wing energy generator sited along an irrigation canal in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 illustrates an embodiment of an articulated wing energy generator sited along an irrigation canal 102 in accordance with disclosed embodiments. As shown a base 104 and an energy generator 106 may be positioned near a fluid flow 108, in this embodiment an irrigation canal 100 containing flowing water. An extendable arm 110 is coupled to the energy generator 106 through a suitable joint 112, shown in this embodiment as a rotating gimbal joint 112. The other end of the extendable arm 110 includes a fin or wing 114 that is coupled to the extendable arm through a pivot joint 116 and is positionable in the fluid flow 108. Embodiments of the pivot joint 116 may include a ratcheting mechanism, a hinge, an electronically controlled joint, or the like, that positions the fin or wing 114 in a first orientation causing the extendable arm 110 to move due to the fluid flow 108 moving over the fin or wing 114. As indicated by the dotted arrow, when the extendable arm 110 moves to a set point 118A, the pivot joint 116 changes the orientation of the fin or wing 114 and causes the extendable arm 110 to move back to an opposite set point 118B and then changes the orientation of the fin or wing 114 back and repeats the cycle.

The motion of the extendable arm 110 provides the energy to move the energy generator 106 (e.g., electric generator, hydraulic generator, pneumatic generator, mechanical generator, or the like) and generate energy. As also illustrated the energy generated may be fed into an electrical power grid 120 through a meter 122 and other power conditioning devices (not shown) as would be apparent to those of ordinary skill in the art having the benefit of this disclosure.

As also shown in FIG. 1, the energy generator 106 may be positioned next to the fluid flow 108 and requires a relatively small footprint. Likewise, the amount of impingement into, and motion within, the fluid flow 108 can be set by appropriate stops or set points (e.g., 118A, 118B) on the extendable arm 110, the gimbal joint 112, the pivot joint 116, and the like. In some embodiments, it is possible to remove the extendable arm 110 from the fluid flow 108 altogether to, for example, allow a boat to pass through, or the like.

In other embodiments, it may be desirable to submerge the energy generator 106 and extendable arm 110 within the fluid flow 108. For example, to be at a sufficient depth to allow boat and ship traffic to pass above.

Figure 2:
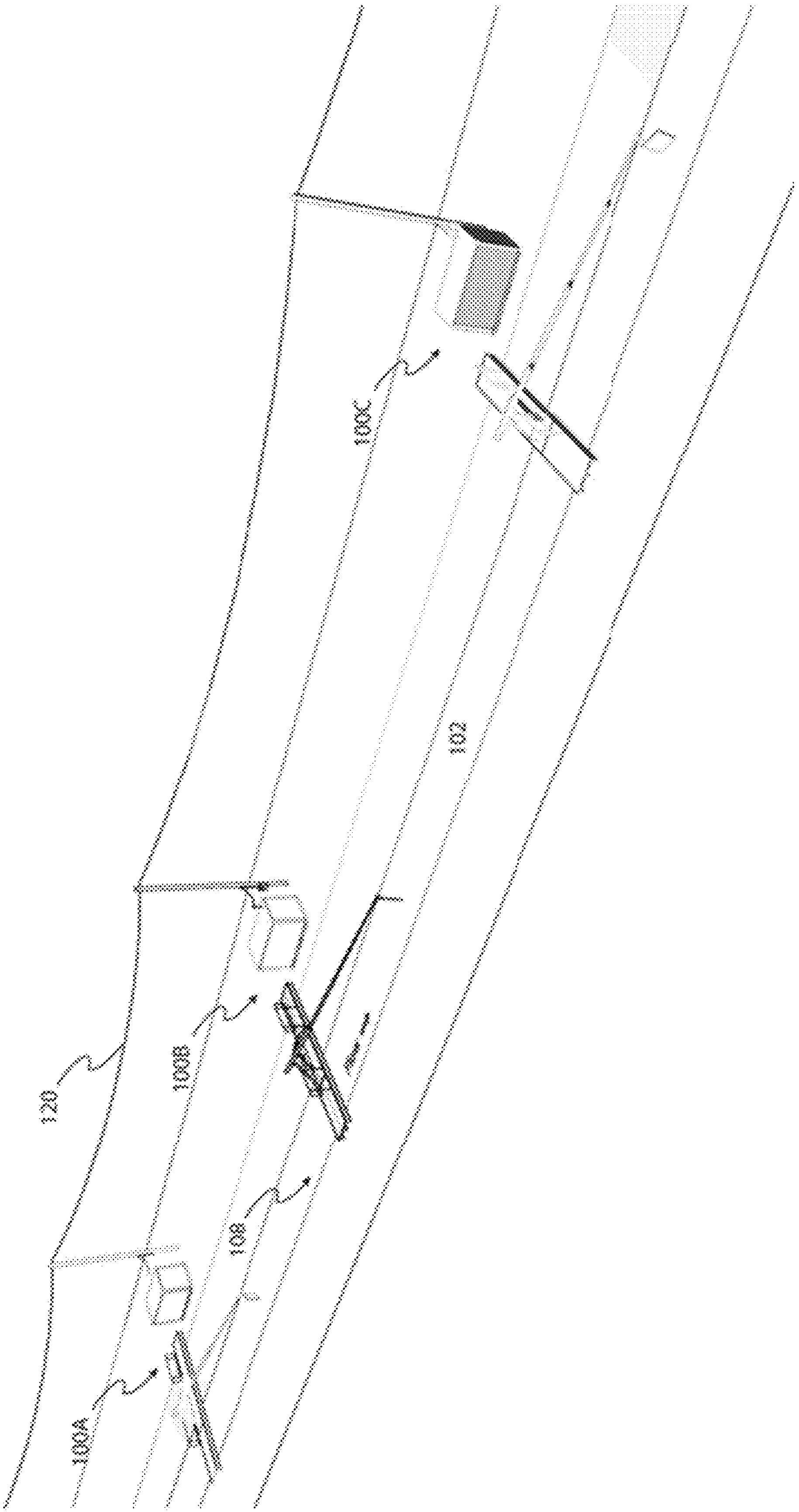
FIG. 2 shows an exemplary embodiment where several articulated wing energy generator systems are located along the bank of a fluid flow in accordance with disclosed embodiments.

FIG. 2 shows an exemplary embodiment where several articulated wing energy generator systems 100A, 100B, 100C are located along the bank of a fluid flow 108, in this embodiment an irrigation canal 102 containing water. As would be apparent to those of ordinary skill in the art having the benefit of this disclosure, among other things, the relatively small footprint and freedom from significant obstruction or interference with the fluid flow, enable multiple systems 100A-C to be installed and, potentially, generate significant amounts of energy.

Figure 3A:
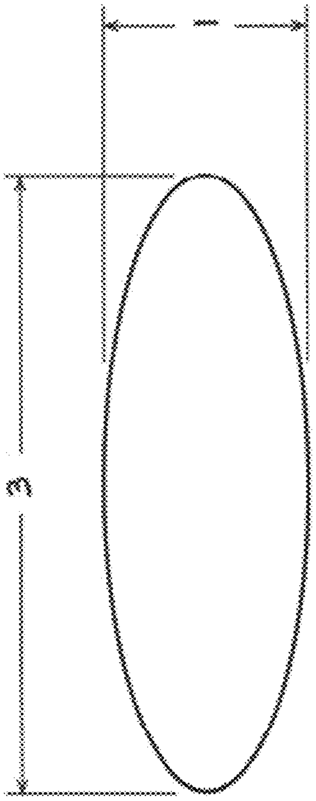
FIGS. 3A-3C illustrate some hydrodynamic cross-sections usable with the extendable arm, the fin or wing, and other fluid-impinged components of disclosed embodiments.
Figure 3B:
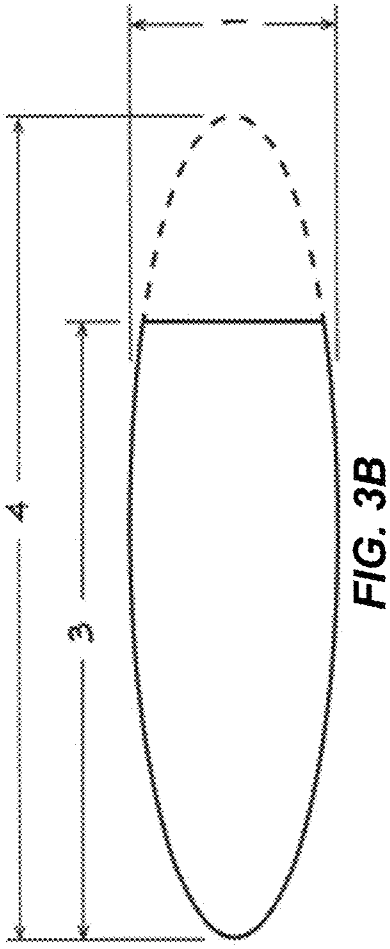
Figure 3C:
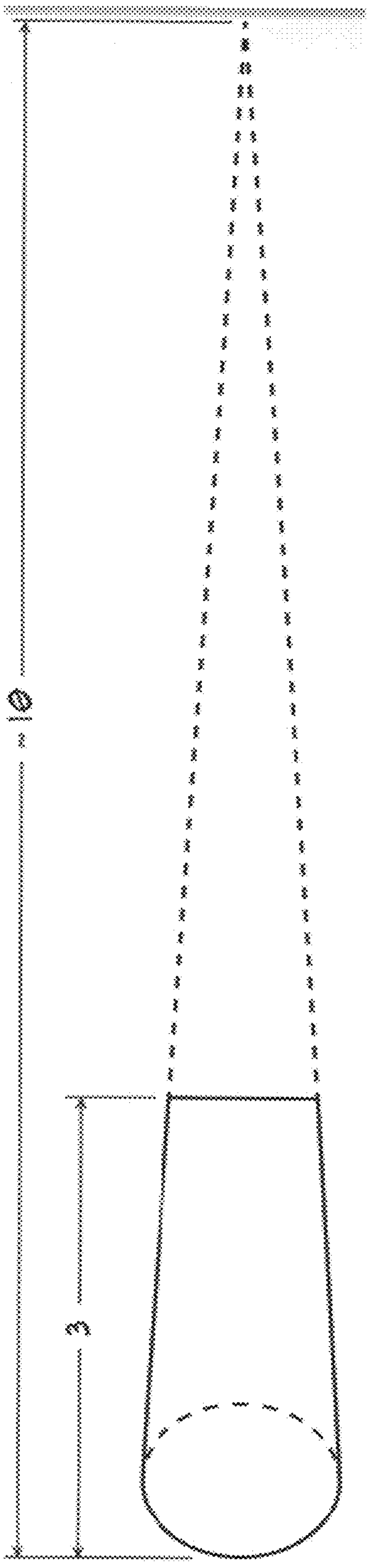

FIGS. 3A-3C illustrate some hydrodynamic cross-sections usable with the extendable arm, the fin or wing, and other fluid-impinged components of disclosed embodiments. For example, FIG. 3A illustrates an oblate circle cross-section that is a stable hydrodynamic shape. Narrower cross-sections can collapse vertically under the pressure. FIG. 3B illustrates a trimmed oblate circle cross-section that, for the same dimensions as the cross-section in FIG. 3A, has less hydrodynamic resistance due to the flat rear side and creates a minimal wake. FIG. 3C illustrates a Kamm Tail that has even less hydrodynamic resistance then either the FIG. 3A-3B cross-sections. Other cross-sections may also be used.

Figure 4A:
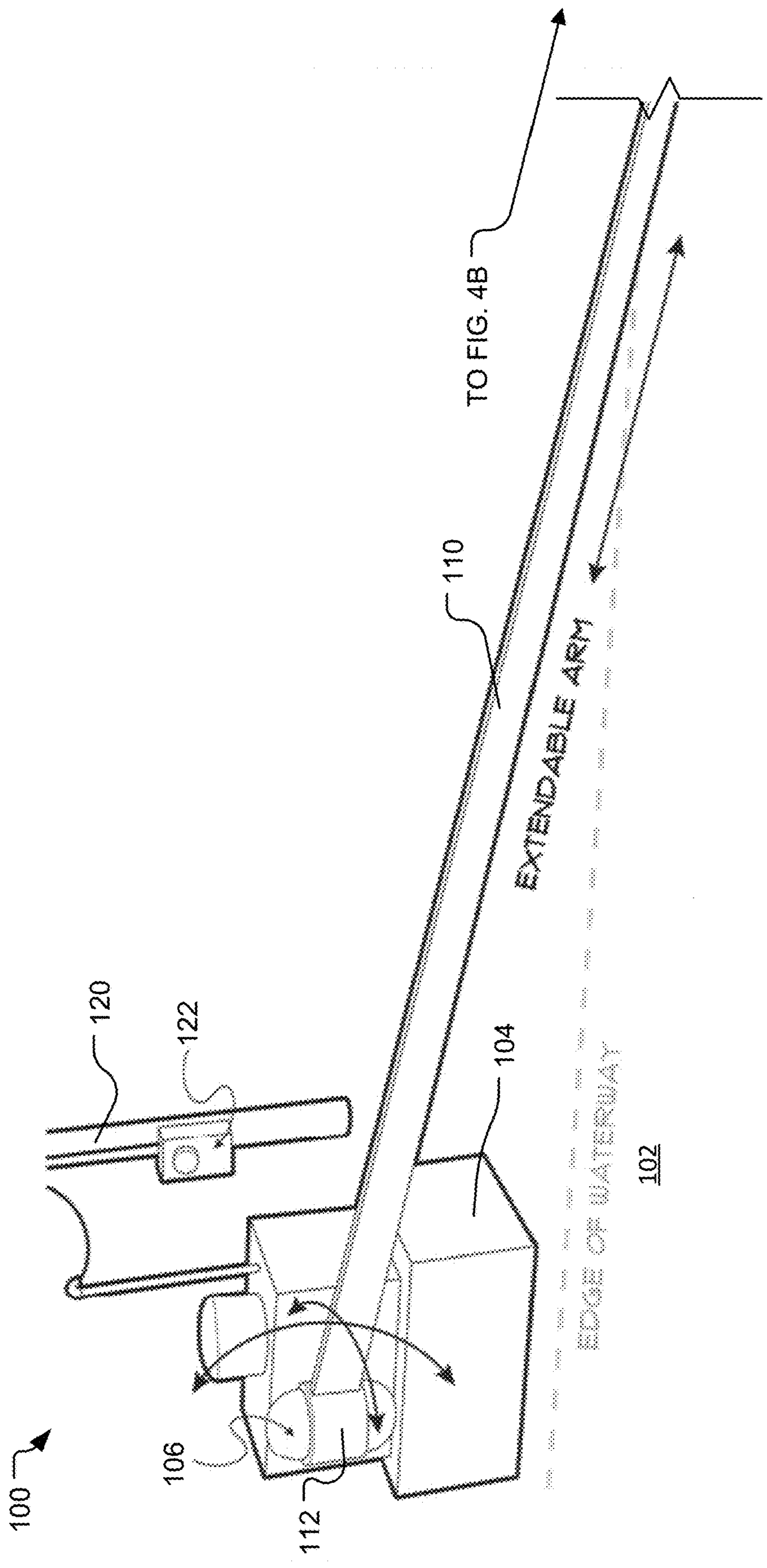
FIGS. 4A-4B illustrate a schematic view of articulating wing energy generator systems in accordance with disclosed embodiments.
Figure 4B:
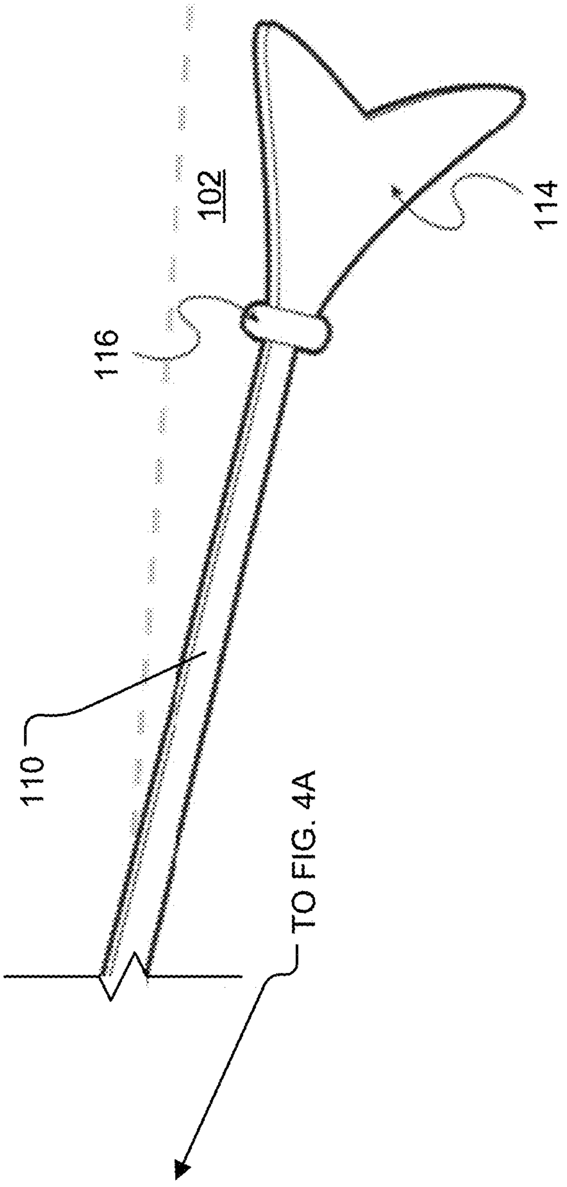
Figure 5:
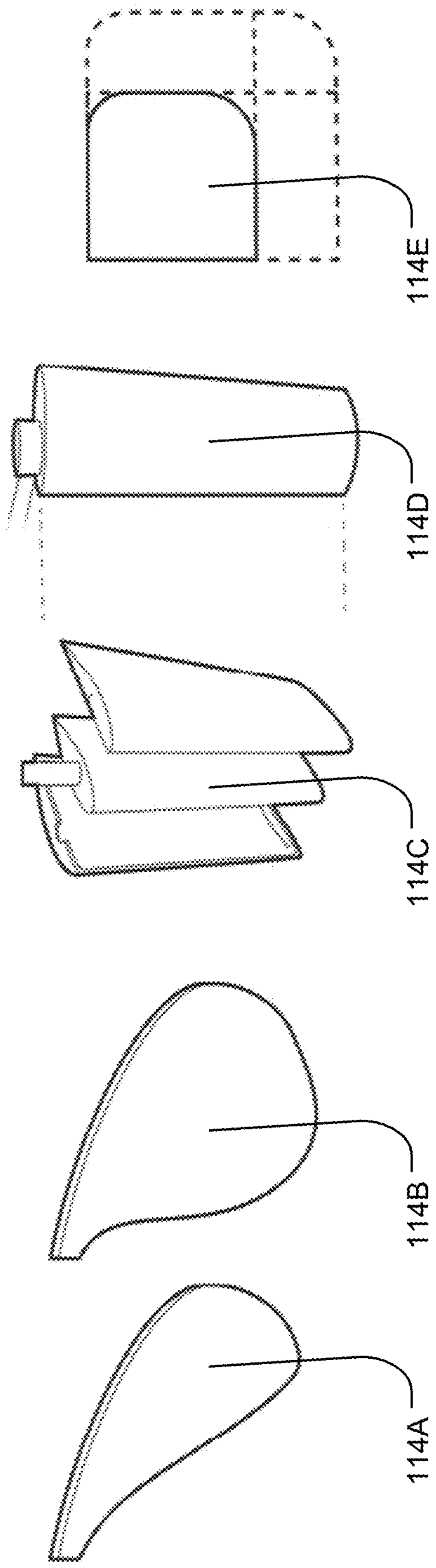
FIG. 5 illustrates a number of fin or wing embodiments in accordance with this disclosure.

FIGS. 4A-4B illustrate a schematic view of articulating wing energy generator systems 100 in accordance with disclosed embodiments. As also shown in FIG. 5, various fin or wing 114A-E shapes, sizes, constructions, and the like may be used as would be apparent to those of ordinary skill in the art having the benefit of this disclosure. For example, a multi-piece construction may be used (e.g., 114C-D) or a foldable or otherwise extendible wing (e.g., 114E) may be used. Other configurations are also possible. Likewise, multiple extendable arms 110, bent arms, telescoping arms, and the like, may be used to take advantage of different fluid flows 108, different locations for the energy generator 106, different motions of the arm, and the like.

Figure 6:
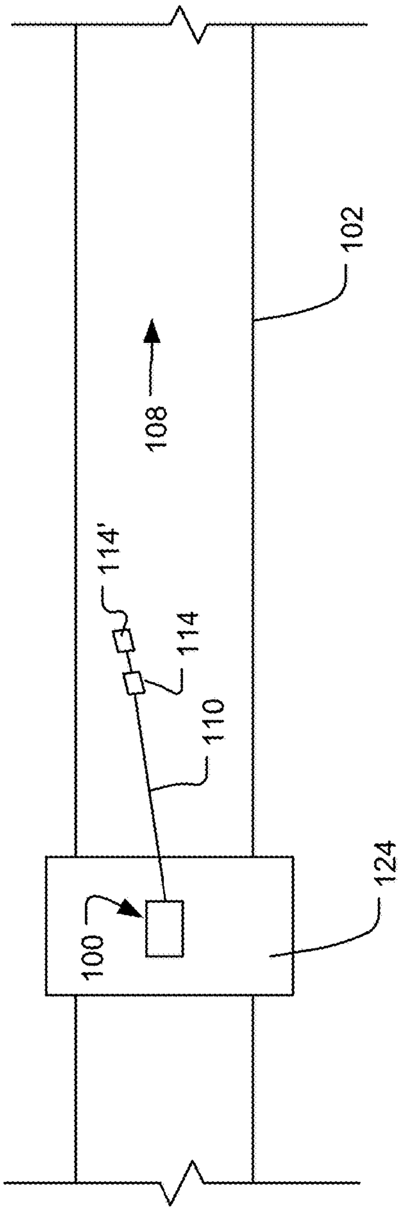
FIG. 6 is a schematic illustration of a mid-fluid flow mounting of articulating wing energy generator systems in accordance with disclosed embodiments.

FIG. 6 is a schematic illustration of a mid-fluid flow mounting of articulating wing energy generator systems 100 in accordance with disclosed embodiments. As shown, articulated wing generator 100 may be mounted on platform 124 that extends over the fluid flow 108 (in this example, irrigation canal 102) so that extendable arm 110 and wings 114, 114' may be positioned to articulate near the middle of fluid flow 108 where, potentially, the fluid is deeper, swifter, or otherwise more advantageous to use. As also shown, extendable arm 110 may incorporate multiple wings 114, 114' on the same arm 110. Wings 114, 114' may have the same, or differing, fluid flow characteristics depending on the fluid flow 108 and intended motion of extendable arm 110.

Figure 7:
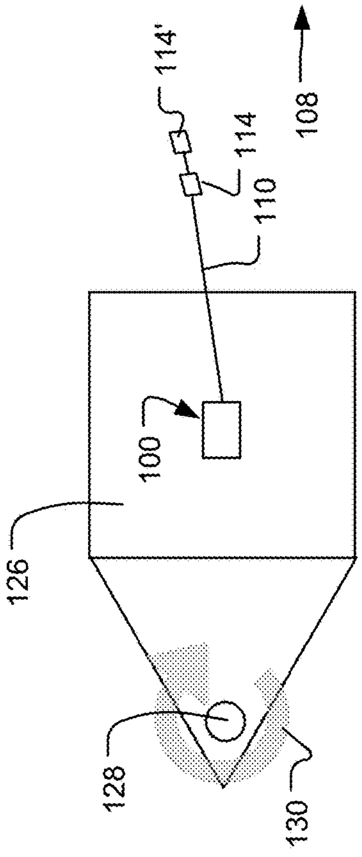
FIG. 7 is a schematic illustration of a pivotable mounting of articulating wing energy generator systems in accordance with disclosed embodiments.

FIG. 7 is a schematic illustration of a pivotable mounting of articulating wing energy generator systems 100 in accordance with disclosed embodiments. As shown, articulating wing generator 100 may be mounted on a floating platform 126 connected to a stationary pivot point 128. When fluid flow 108 changes direction, platform 126 may rotate, as indicated schematically by arrow 130, about the pivot point 128. As would be understood by those of skill in the art having the benefit of this disclosure, rotation 130 may be in either direction, may be partially limited or restrained, may be accomplished by powered motors, engines, or the like, may be accomplished by rudders or fins on the platform 126, as applicable to the particular fluid flow being exploited. In some embodiments, a platform 126 may be located on an ocean or seaside where tidal changes cause a "reversal" of the fluid flow 108.

Figure 8:
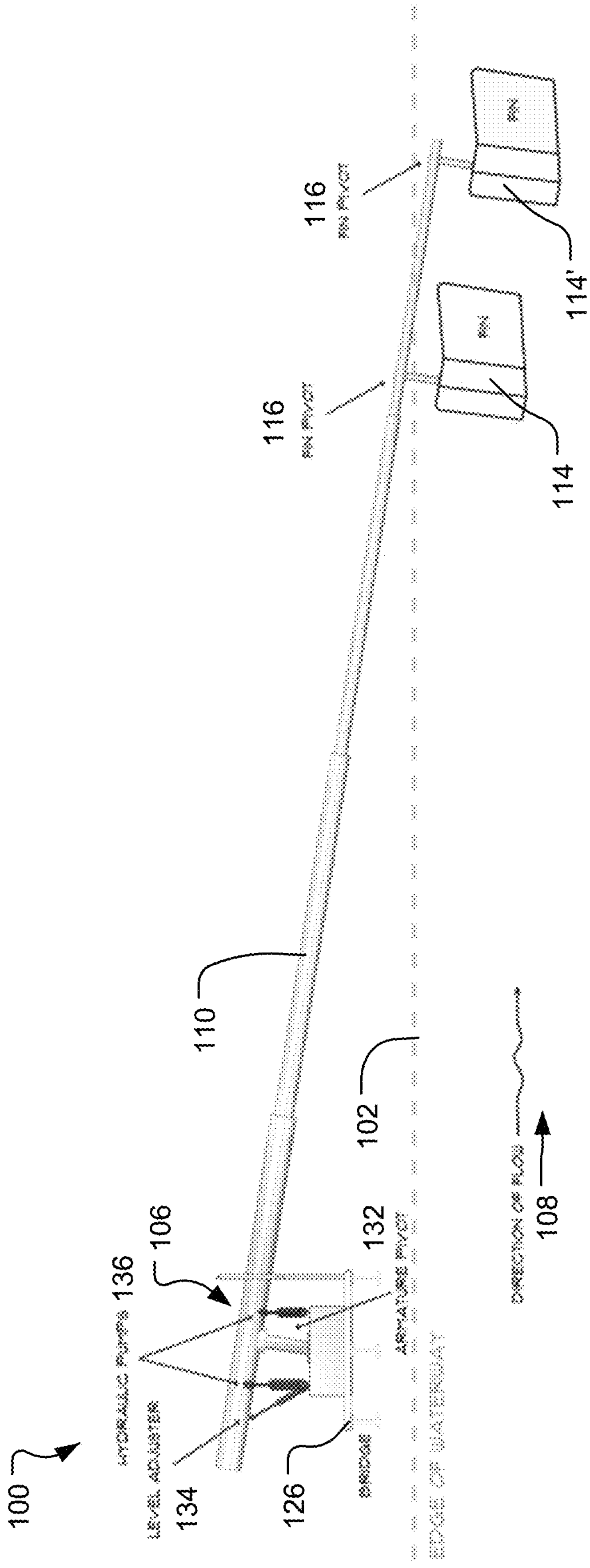
FIG. 8 is a side view schematic illustration of an articulating wing energy generator system in accordance with disclosed embodiments.

FIG. 8 is a side view schematic illustration of an articulating wing energy generator system 100 in accordance with disclosed embodiments. As shown in this exemplary embodiment, a dual fin 114, 114' extendable arm 110 is positioned in a fluid flow 108 (e.g., in an irrigation canal 102). Bridge or platform 125 spans the canal 102 and allows the extendable arm 110 to be positioned advantageously in the fluid flow 108. In some embodiments, extendable arm 110 may be mounted on a armature pivot 132 or the like and a desired depth maintained through a level adjuster 134 or the like. As also shown, some embodiments may have an energy generator 106 that comprises one or more hydraulic pumps 136 that convert and store the energy from the motion of the arm 110 due to the fluid flow 108 as disclosed herein.

Figure 9:
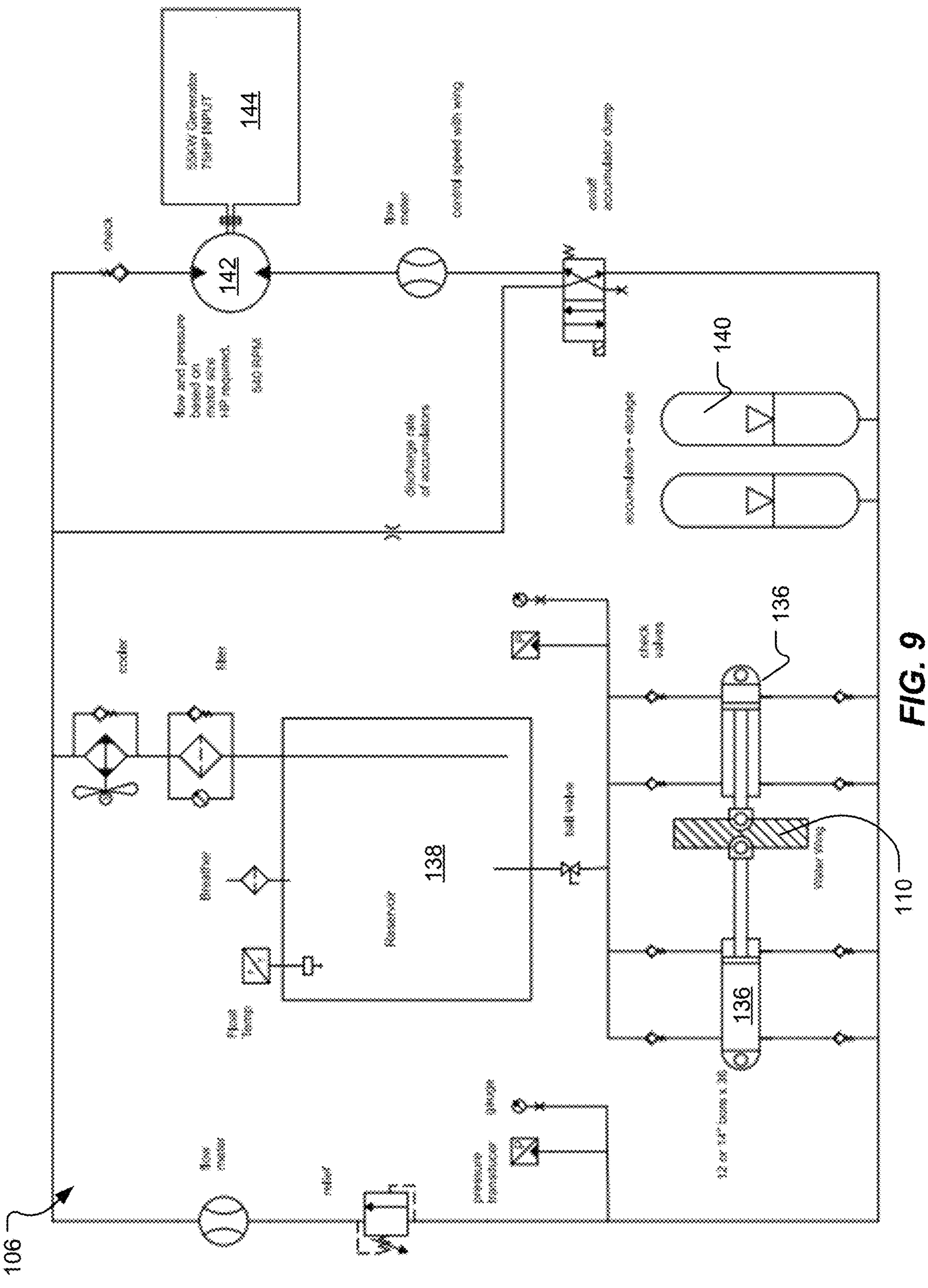
FIG. 9 is a schematic illustration of an energy generator 106 in accordance with disclosed embodiments.

FIG. 9 is a schematic illustration of an energy generator 106 in accordance with disclosed embodiments. As shown, the motion of extendable arm 110 due to fluid flow 108 operates hydraulic pumps 136 which pump hydraulic fluid to a reservoir 138 and associated accumulators 140 for storage. In some embodiments, the hydraulic fluid can be controllably released, using the exemplary hydraulic circuit shown, to power a hydraulic motor/pump 142 which, in turn, may power an electric generator 144 or the like. Other embodiments and configurations are also possible.

Although various embodiments have been shown and described, the present disclosure is not so limited and will be understood to include all such modifications and variations would be apparent to one skilled in the art.

What is claimed is:

1. An energy generation system to generate energy from a fluid flow in an irrigation canal, the energy generation system comprising:

an extendable arm that extends into a fluid flow in an irrigation canal;

a fin, having an oblate circular cross section, connected to one end of the extendable arm and causing, due to the fluid flow, the extendable arm to move from a first orientation within the fluid flow to a second orientation within the fluid flow;

a rotating gimbal joint connected to a second end of the extendable arm that couples the extendable arm to an energy generator, the energy generator comprising:

at least one hydraulic pump that pumps a hydraulic fluid in a fluid circuit due to the motion of the extendable arm from the first orientation to the second orientation;

a hydraulic motor in the fluid circuit and that operates due to the hydraulic fluid; and an electric generator operated by the hydraulic motor to generate electrical energy.

2. The energy generation system of claim 1 wherein the energy generator is mounted on a base that is located adjacent to the irrigation canal.

3. The energy generation system of claim 1 wherein the energy generator is mounted on a base that is located within the irrigation canal.

4. The energy generation system of claim 1 wherein the energy generator is mounted on a base that extends over the fluid flow.

5. The energy generation system of claim 1 wherein the fluid flow can change direction and the energy generator is mounted on a base that rotates with the change in direction of the fluid flow.

6. The energy generation system of claim 1 further comprising a second fin attached to extendable arm and in contact with the fluid flow.

7. The energy generation system of claim 1 further comprising:
- a hydraulic accumulator in the fluid circuit that stores hydraulic fluid under pressure for selective release to the hydraulic motor.

8. The energy generation system of claim 1 further comprising:
- a hydraulic reservoir in the fluid circuit that stores hydraulic fluid.

9. An energy generation system to generate energy from a fluid flow, the energy generation system comprising:
- a first generation unit comprising:
  - a first extendable arm that extends into a fluid flow;
  - a first fin, having an oblate circular cross section, connected to one end of the first extendable arm and causing, due to the fluid flow, the first extendable arm to move from a first orientation within the fluid flow to a second orientation within the fluid flow; and
- a first rotating gimbal joint connected to a second end of the first extendable arm that couples the first extendable arm to a first energy generator, the first energy generator comprising:
- at least one first hydraulic pump that pumps a hydraulic fluid in a first fluid circuit due to the motion of the first extendable arm from the first orientation to the second orientation;
- a first hydraulic motor in the fluid circuit and that operates due to the hydraulic fluid; and
- a first electric generator operated by the first hydraulic motor to generate electrical energy; and
- a second generation unit comprising:
  - a second extendable arm that extends into the fluid flow;
  - a second fin, having an oblate circular cross section, connected to one end of the second extendable arm and causing, due to the fluid flow, the second extendable arm to move from a first orientation within the fluid flow to a second orientation within the fluid flow; and
- a second rotating gimbal joint connected to a second end of the second extendable arm that couples the second extendable arm to a second energy generator, the second energy generator comprising:
- at least one second hydraulic pump that pumps a hydraulic fluid in a second fluid circuit due to the motion of the second extendable arm from the first orientation to the second orientation;
- a second hydraulic motor in the second circuit and that operates due to the hydraulic fluid; and
- a second electric generator operated by the second hydraulic motor to generate electrical energy.

10. The energy generation system of claim 9 wherein the fluid flow comprises water flow in an irrigation canal and the first and second energy generators are mounted on a base that is located adjacent to the irrigation canal.

11. The energy generation system of claim 9 wherein the fluid flow comprises water flow in an irrigation canal and at least one of the first or second energy generators is mounted on a base that is located within the irrigation canal.

12. The energy generation system of claim 9 wherein the fluid flow comprises water flow in an irrigation canal and at least one of the first or second energy generators is mounted on a base that extends over the fluid flow.

13. The energy generation system of claim 9 further comprising:
- a hydraulic accumulator in at least one of the first or second fluid circuits that stores hydraulic fluid under pressure for selective release to the respective first or second hydraulic motors.

14. The energy generation system of claim 9 further comprising:
- a hydraulic reservoir in at least one of the first or second fluid circuits that stores hydraulic fluid.

15. The energy generation system of claim 9 further comprising an additional fin attached to at least one of the first or second extendable arms and in contact with the fluid flow.

* * * * *